Dec. 25, 1956  F. H. GARDNER ET AL  2,775,124
ANGLE OF ATTACK COMPUTER

Filed Nov. 30, 1953  4 Sheets-Sheet 1

INVENTORS.
FREDERICK H. GARDNER
JAMES C. ELMS
BY DAVID ROSENSTOCK

William R. Lerch
ATTORNEY

Dec. 25, 1956   F. H. GARDNER ET AL   2,775,124
ANGLE OF ATTACK COMPUTER
Filed Nov. 30, 1953   4 Sheets-Sheet 2

*INVENTORS.*
FREDERICK H. GARDNER
JAMES C. ELMS
BY DAVID ROSENSTOCK

William R. Lane
ATTORNEY

Dec. 25, 1956   F. H. GARDNER ET AL   2,775,124
ANGLE OF ATTACK COMPUTER
Filed Nov. 30, 1953   4 Sheets-Sheet 3

INVENTORS.
FREDERICK H. GARDNER
JAMES C. ELMS
BY DAVID ROSENSTOCK

*William R Lane*
ATTORNEY

Dec. 25, 1956  F. H. GARDNER ET AL  2,775,124
ANGLE OF ATTACK COMPUTER

Filed Nov. 30, 1953  4 Sheets-Sheet 4

*INVENTOR.*
FREDERICK H. GARDNER
JAMES C. ELMS
BY DAVID ROSENSTOCK

William R Lane

ATTORNEY

United States Patent Office 2,775,124
Patented Dec. 25, 1956

2,775,124

ANGLE OF ATTACK COMPUTER

Frederick H. Gardner, Long Beach, James C. Elms, Newport Beach, and David Rosenstock, Long Beach, Calif., assignors to North American Aviation, Inc.

Application November 30, 1953, Serial No. 395,072

5 Claims. (Cl. 73—180)

This invention pertains to means for generating a shaft rotation or a voltage which is proportional to the angle of attack of a moving vehicle. This invention more particularly pertains to means for computing the angle of attack of a moving aircraft.

The usual method of sighting a target aircraft from a pursuing aircraft in order to fire rockets at the target aircraft is to measure the angle between the fuselage reference line of the pursuing craft relative to the target. This is usually accomplished by means of a target-sensing device such as an optical sight, or a radar. Corrections for the velocity of the enemy aircraft relative to the pursuing aircraft are sometimes introduced.

One of the appreciable errors inherent in fin stabilized rockets is their tendency to align themselves in the direction of their velocity relative to the air mass surrounding them. To correct the aiming of rockets from the pursuing aircraft it is necessary to know at all times the true angle of attack of the pursuing aircraft relative to the air mass surrounding said aircraft. While various schemes for measuring the angle of attack have been previously introduced, they all have serious disadvantages. None of the systems heretofore proposed takes into consideration all of the forces of the control surfaces, nor all of the parameters which affect the angle of attack. These prior known angle of attack measuring devices only provide a measurement of angle of attack when the aircraft is in its trimmed condition. They do not compensate for movements of the aircraft out of the trimmed condition and, hence, are unsatisfactory for use in sighting rockets.

This invention contemplates the mechanization, by a novel configuration, of a power series equation for angle of attack, and utilizes a minimum number of elements to thereby achieve the accuracy required for rocket firing. The device of this invention utilizes the ram and static pressures together with the acceleration of the aircraft in the direction of its yaw axis to compute the angle of attack. The accelerometers are displaced from the center of gravity of the aircraft so that angular accelerations about the pitch axis thereof are accommodated to measure angle of attack during untrimmed flight. The device of this invention mechanizes the equation for angle for attack wherein the equation for angle of attack has been expanded into a power series in which the coefficients of the various terms are functions of the separate variables measurable upon the aircraft.

It is therefore an object of this invention to provide means for mechanizing a power series expansion of empirical equations dependent upon a plurality of independent variables.

It is another object of this invention to provide means for generating a shaft rotation proportional to the angle of attack of a vehicle.

It is another object of this invention to provide means for creating an electrical signal proportional to the angle of attack of a vehicle.

It is still another object of this invention to provide means for creating a shaft rotation proportional to the angle of attack of an aircraft.

It is yet another object of this invention to provide means for generating an electrical signal proportional to the angle of attack of an aircraft.

It is still another object of this invention to provide means responsive to the ram and static pressure, in combination with means responsive to the acceleration in the direction of the yaw axis and the angular acceleration about the pitch axis of an aircraft to generate a signal proportional to the angle of attack of said aircraft.

It is still another object of this invention to provide an improved angle of attack computer.

It is another object of this invention to provide means responsive to the weight and acceleration of an aircraft together with the differential and static pressure measured upon said aircraft to generate a signal proportional to the angle of attack of said aircraft.

It is another object of this invention to provide analogue computer means for generating a signal proportional to the angle of attack of a moving vehicle.

Other objects of invention will become apparent from the following description taken in connection with the accompanying drawings, in which Fig. 1 is a block diagram of the device of this invention;

Figure 1:
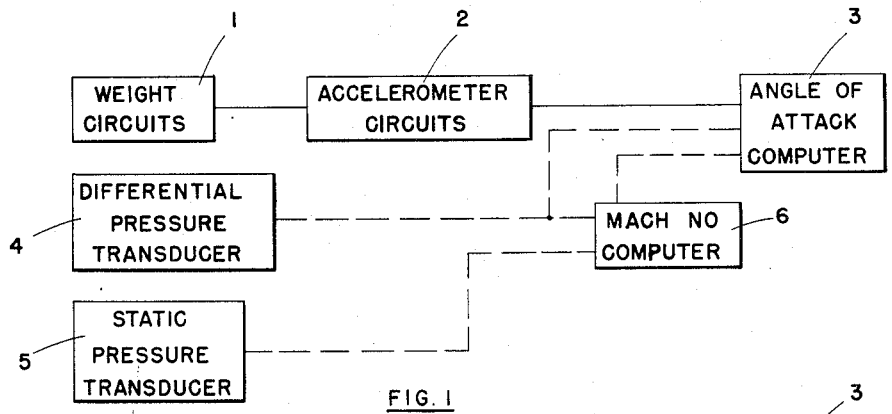

In Fig. 1, weight circuit means 1 generates an electrical signal proportional to the weight, W, of the vehicle upon which it is mounted. This signal is preferably an alternating voltage signal. This electrical signal is connected to the input of accelerometer circuit means 2 where it is multiplied by the measured acceleration, $N'_y$ of the vehicle in the direction of its yaw axis. Accelerometer means 2 is placed forward of the center of gravity of the aircraft to compensate for angular acceleration when the aircraft is in its untrimmed condition. The electrical output of accelerometer circuit means 2 is connected to the input of angle of attack computer 3. Differential pressure transducer 4 and static pressure transducer 5 are connected to Pitot tube 49, as shown more particularly in Fig. 5. The mechanical outputs of differential pressure transducer 4 and static pressure transducer 5 are connected to the input of Mach number computer means 6. Mach number computer means 6 generates a shaft rotation proportional to the Mach number at which the aircraft, or vehicle upon which it is mounted, is operating. The mechanical output of Mach number computer 6 is connected to the input of angle of attack computer 3. The shaft rotation mechanical output of differential pressure transducer 4 is not only connected to Mach number computer 6 but is also connected to the input of angle of attack computer 3.

Figure 2:
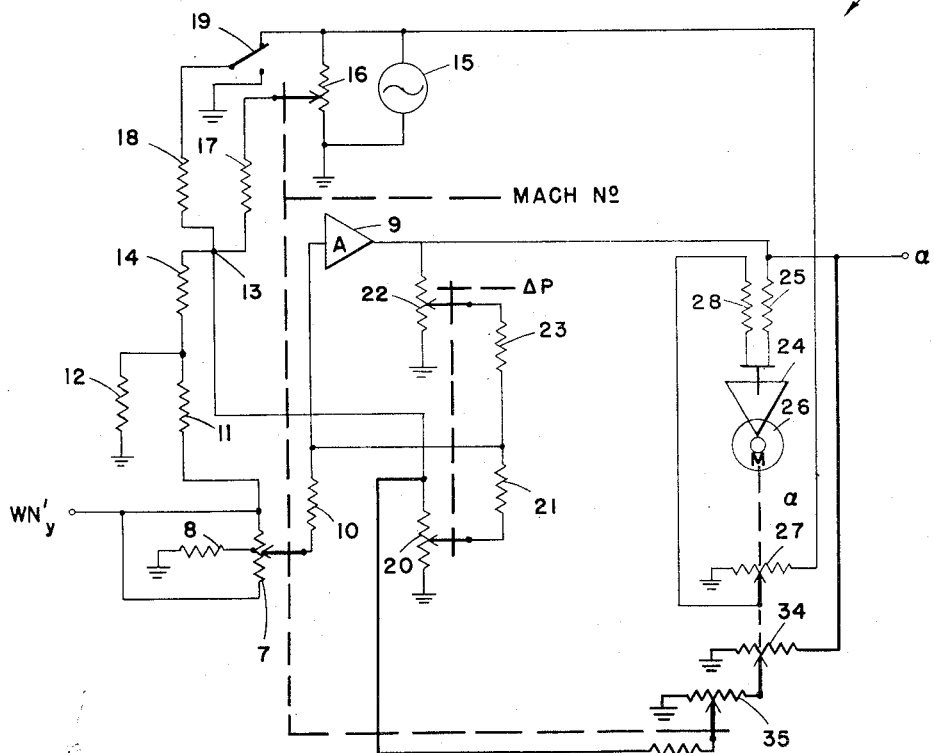
Fig. 2 is a circuit diagram of the angle of attack computer of this invention.

Angle of attack computer 3 is shown in detail Fig. 2. In Fig. 2, the voltage output from accelerometer circuit 2 is connected to both sides of potentiometer 7. Potentiometer 7 is tapped and grounded through resistor 8. The movable arm of potentiometer 7 is mechanically connected to be driven by means of Mach number computer 6. The resistance of potentiometer 7 and resistor 8 is distributed so that the voltage upon the movable arm of potentiometer 7 is proportional to a predetermined function of the Mach number. This first function will be described more fully hereinafter, and is designated herein as $F_1(M)$. The movable arm of potentiometer 7 is connected to the input of amplifier 9 through resistor 10. The output of accelerometer circuit 2 is also connected to the series combination of resistors 11 and 12. The junction between resistors 11 and 12 is connected to junction 13 through summing resistor 14. Voltage source 15 generates an alternating voltage of substantially constant peak amplitude. The voltage of voltage source 15 is in phase with the alternating exciting voltage of voltage source 37 in weight circuits 1. The voltage of voltage source 15 is connected across potentiometer 16. Potentiometer 16 is a nonlinear potentiometer which has its resistance distributed so that when the movable arm thereof is driven in accordance with the Mach number of the aircraft upon which it is mounted, the voltage upon the movable arm thereof is proportional to the zero lift angle of attack, $\alpha_0(M)$ of said aircraft. Variations of $\alpha_0(M)$ between individual aircraft are compensated by changing the value of the resistance of potentiometer 16. The movable arm of potentiometer 16 is mechanically driven by Mach number computer 6 and is electrically connected to junction 13 through summing resistor 17. When the flaps of the aircraft are down, an additional voltage must be supplied to compensate for the increased angle of attack. Switch 19 is connected to be operated by the flaps of the aircraft. Voltage source 15 is connected to junction 13 through resistor 18 when the flaps are down and switch 19 is in the position shown. When the flaps of the aircraft are up, switch 19 is moved to be connected to the ground terminal to thereby add a zero voltage to the voltages generated at resistors 14 and 17. Hence, the voltage generated at the junction between resistors 11 and 12 is added to the voltage on the movable arm of switch 19 and to the voltage on the movable arm of potentiometer 16. This entire voltage is applied across potentiometer 20. Potentiometer 20 is a linear potentiometer whose arm is mechanically connected to be driven by differential pressure transducer 4. The arm of potentiometer 20 is electrically connected through resistor 21 to the input of amplifier 9, where its voltage is added to the voltage upon the movable arm of potentiometer 7. Potentiometer 22 is connected across the output of amplifier 9. Potentiometer 22 is a linear potentiometer which is mechanically connected to be driven by means of differential pressure transducer 4. The movable arm of potentiometer 22 is electrically connected through resistor 23 to the input of amplifier 9 to thereby divide the sum of the voltages upon the movable arms of potentiometers 7 and 20 by the differential pressure. The electrical output of amplifier 9 is then directly proportional to the angle of attack, $\alpha$, of the aircraft. To generate a shaft rotation proportional to $\alpha$, the electrical output of amplifier 9 is connected to the input of servo amplifier 24 through summing resistor 25. Servo amplifier 24 drives motor 26 in accordance with the angle of attack. Voltage source 15 is connected across potentiometer 27 which is mechanically driven by motor 26. The voltage upon the movable arm of potentiometer 27 is electrically connected through resistor 28 to the input of servo amplifier 24 to insure that the shaft rotation of motor 26 is directly proportional to the angle of attack.

Figure 7:
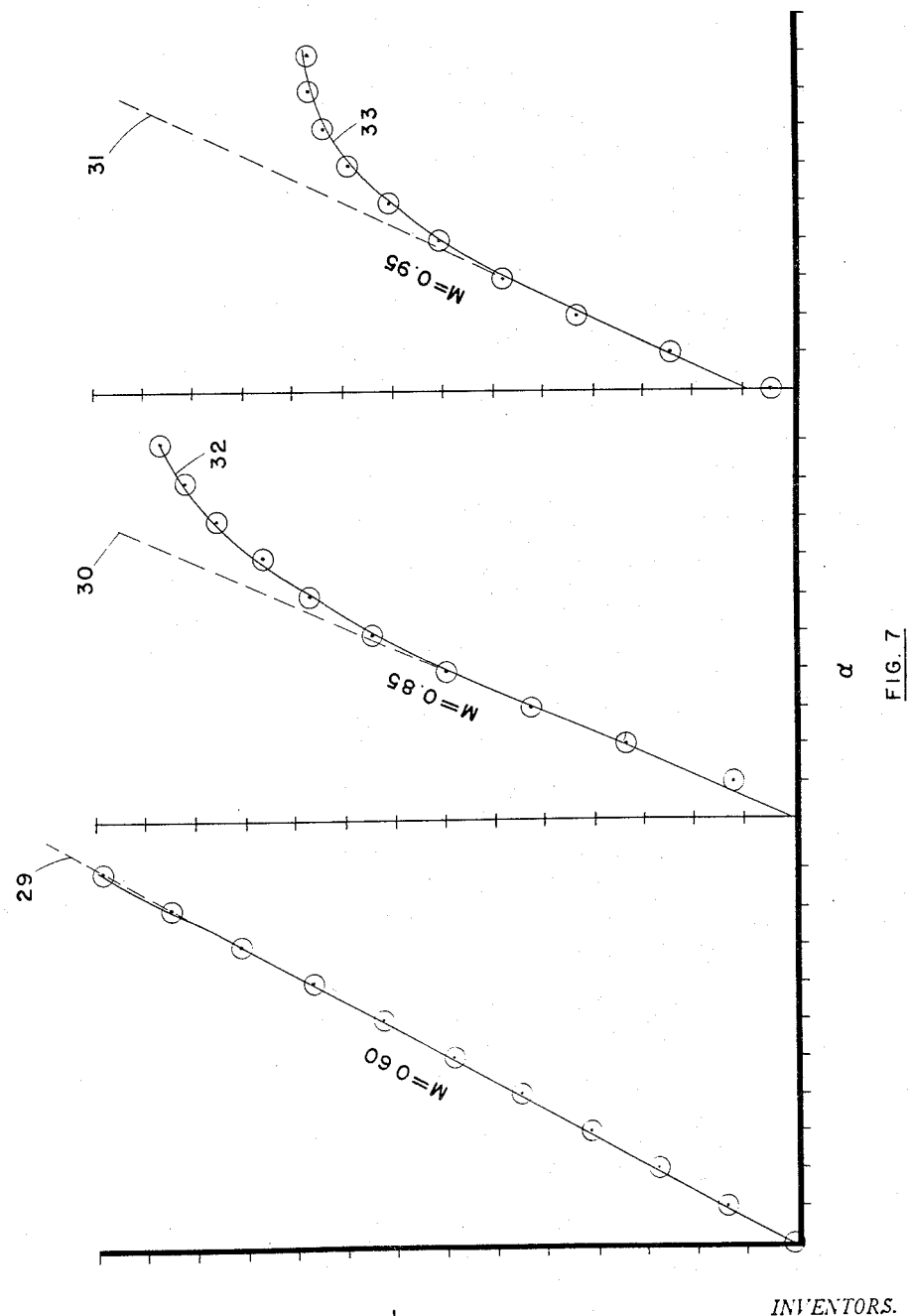
Fig. 7 is a graph of the lift coefficient of a typical aircraft plotted as a function of the angle of attack for various Mach numbers of operation of said aircraft.

The portion of Fig. 2 so far described is sufficient to obtain a voltage or a shaft rotation proportional to the angle of attack, provided the lift coefficient, $C_L$, plotted as a function of angle of attack, $\alpha$, is a linear function, as shown by the dotted lines 29, 30, and 31 in Fig. 7. Notice, however, that the true curves of lift coefficient, $C_L$, plotted against angle of attack, $\alpha$, vary from a straight line, as shown by curves 32 and 33.

The nonlinear characteristic of $C_L$ is compensated for by introducing a voltage proportional to the square of the angle of attack multiplied by a function, $F_2(M)$, of Mach number. The output of amplifier 9 for this second order correction is connected across potentiometer 34, while the movable arm of potentiometer 34 is driven by motor 26 in accordance with the angle of attack. Hence, the voltage upon the movable arm of potentiometer 34 is proportional to the square of the angle of attack. This voltage is connected across potentiometer 35, which is a nonlinear potentiometer adjusted to have its resistance distributed in accordance with $F_2(M)$. The movable arm of potentiometer 35 is driven by means of Mach number computer 6 so that the voltage upon the movable arm of potentiometer 35 introduces second order correction into the computer of this invention to cause the voltage at the output of amplifier 9 and the rotation of the shaft of motor 26 to be proportional to the angle of attack, even at high angles of attack at all Mach numbers. The movable arm of potentiometer 35 is electrically connected through resistor 36 to potentiometer 20 at its connection to junction 13.

Hence, the device of this invention is an angle of attack computer which takes into consideration the nonlinear characteristics of the lift coefficient as a function of Mach number and angle of attack, and compensates for the dynamic effect due to rapid movements of the supporting aircraft.

Figure 3:
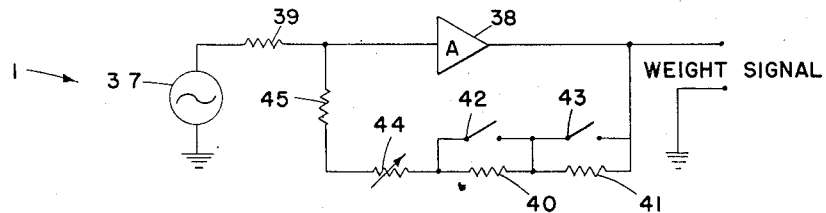
Fig. 3 is a circuit diagram of a typical means for generating a signal proportional to the weight of an aircraft.

Weight circuit 1 is shown more particularly in Fig. 3. In Fig. 3, voltage source 37, which is preferably an alternating voltage source, is connected to the input of amplifier 38 through resistor 39. Resistors 40 and 41 are not shorted when rockets upon the supporting aircraft are in their launching tubes. When each rocket is launched it closes a switch similar to switch 42 or 43 to provide a different amount of feedback around amplifier 38. Variable resistor 44 may be a gasoline fuel gauge or an adjustable resistor for correcting for the weight of the fixed load of the aircraft. Resistor 45 puts in a correction which corresponds to the fixed weight of the aircraft. The result is an electrical signal at the output of amplifier 38 which is directly proportional to the weight of the aircraft. This electrical signal is connected to the input of accelerometer circuit 2, shown more particularly in Fig. 4.

Figure 4:
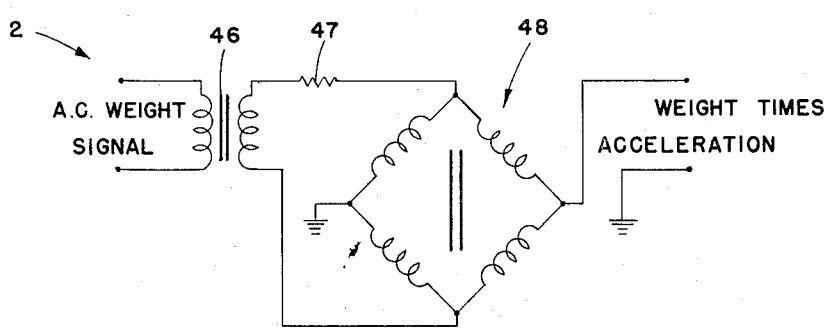
Fig. 4 is a circuit diagram of a typical accelerometer.

In Fig. 4, the output of weight circuit 1 is connected to the input of transformer 46. The output of transformer 46 is connected through resistor 47 to the input of a variable inductance bridge 48 whose inductances are varied by a moving ferromagnetic core which is sensitive to acceleration. When bridge 48 is unbalanced, an electrical voltage which is proportional to the weight of the aircraft together with its load multiplied by the linear and angular acceleration of the aircraft in the sensitive direction of accelerometer circuits 2 is generated at the output of accelerometer circuits 2. This sensitive direction is defined as being parallel to the yaw axis of the aircraft.

Figure 5:
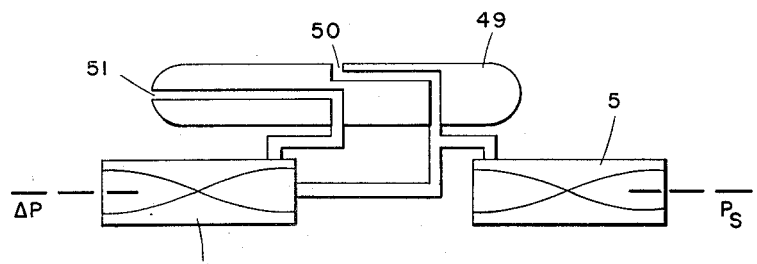
Fig. 5 is a schematic diagram of a conventional Pitot tube, together with transducer means for generating shaft rotations proportional to the differential pressure and the static pressure measured upon a moving vehicle.

In Fig. 5, Pitot tube 49 has an intake 50 for static air pressure, and an intake 51 for ram air pressure. Both intake 50 and intake 51 are connected to differential pressure transducer 4 in order to produce a shaft rotation proportional to the differential pressure. Only static pressure port 50 is connected to the input of static pressure transducer 5, while the inside of the Bourdon tube against which the static pressure operates is evacuated to produce a shaft rotation proportional to the static pressure.

Figure 6:
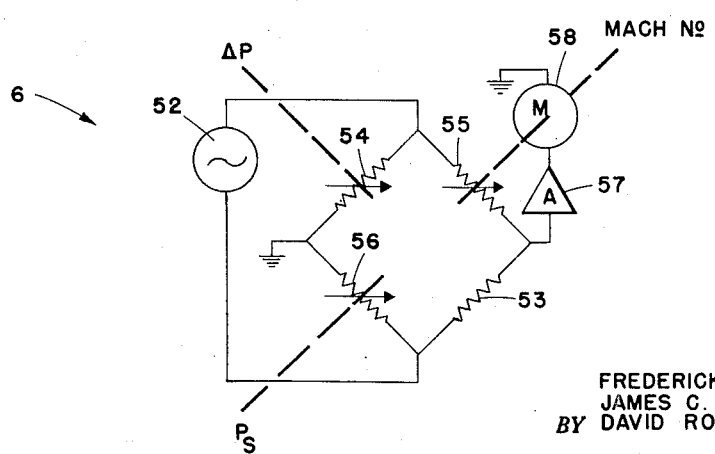
Fig. 6 is a circuit diagram of a Mach number computer.

A typical Mach number computer is shown in Fig. 6. Voltage source 52 is connected across a Wheatstone bridge comprising resistor 53 and variable resistors 54, 55, and 56. The voltage of voltage source 52 is in phase with the voltage of voltage sources 15 and 37. Variable resistors 54, 55, and 56 are nonlinear resistors which are adapted to mechanize the equation for Mach number. Mach number is dependent upon both the differential pressure and the static pressure. Variable resistor 54 is connected to differential pressure transducer 4 to be mechanically driven thereby. Variable resistor 56 is mechanically connected to static pressure transducer 5 to be mechanically driven thereby. The voltage output of the Wheatstone bridge of resistors 53, 54, 55, and 56 is connected through amplifier 57 to drive motor 58 which, in turn, is connected to mechanically drive variable resistor 55 to return the voltage output of the Wheatstone bridge of resistors 53, 54, 55, and 56 to zero. The shaft rotation of motor 58 is directly proportional to the Mach number of the supporting aircraft.

The first angle of attack equation solved by the device of this invention is $$\alpha = \frac{WN'_y}{S\Delta P}F_1(M) + WN'_y F_3(M) + \alpha_0(M) + K_T$$

wherein

W is the total weight of the aircraft.

S is the surface area of the wing of the aircraft.

$N'_y$ is the acceleration of the aircraft in a direction perpendicular to its fuselage reference line and parallel to the yaw axis of the aircraft. This term is measured forward of the center of gravity of the aircraft and is not only a function of linear acceleration of the center of gravity of the aircraft but is also a function of the angular acceleration of the aircraft about its pitch axis.

$\Delta P$ is the difference between the ram and static pressure measured by Pitot tube 49.

$\alpha_0(M)$ is an empirical function of the Mach number, M, of the aircraft. It represents the angle of attack of the aircraft under zero lift conditions.

$F_1(M)$ and $F_3(M)$ are empirical functions of Mach number, M, which are obtained as described hereinafter.

In general, $$L \cos \alpha + D \sin \alpha = WN_y$$

wherein

L is the lift on the aircraft,

D is the drag on the aircraft, $$L = C_L qS$$

$$D = C_D qS$$

wherein $q$ is the incompressible dynamic pressure $$C_L = C_{L\alpha}(\alpha - \alpha_0)$$

wherein $C_{L\alpha}$ is the slope of the curve of $C_L$ plotted against $\alpha$ as shown in Fig. 7. Notice that $C_{L\alpha}$ is assumed constant. Correction for deviation of $C_{L\alpha}$ from a constant is explained and set forth below.

It is known that $$C_D = C_{D0} + KC_L^2 = C_{D0} + KC_{L\alpha}^2(\alpha - \alpha_0)^2$$

wherein $C_{D0}$ is the coefficient of drag when there is zero lift.

By substitution:

$$C_{L\alpha}(\alpha - \alpha_0) \cos \alpha + [C_{D0} + KC_L^2(\alpha - \alpha_0)^2] \sin \alpha = \frac{WN_y}{qS}$$

For small angles of $\alpha$, $\sin \alpha = \alpha$ and $$\cos \alpha = 1 - \frac{\alpha^2}{2}$$

Simplifying, $$C_{L\alpha}(\alpha - \alpha_0) - \frac{C_{L\alpha}}{2}(\alpha - \alpha_0)\alpha^2 + C_{D0}\alpha + KC_{L\alpha}^2(\alpha - \alpha_0)^2\alpha = \frac{WN_y}{qS}$$

$(\alpha - \alpha_0)$ may be set equal to $\alpha$ in all terms except the first. Then:

$$C_{L\alpha}(\alpha - \alpha_0) + C_{D0}\alpha - \left(\frac{C_{L\alpha}}{2} - KC_{L\alpha}^2\right)\alpha^3 = \frac{WN_y}{qS}$$

$$C_{D0}\alpha - \left(\frac{C_{L\alpha}}{2} - KC_{L\alpha}^2\right)\alpha^3$$

is very small, therefore $$C_{L\alpha}(\alpha - \alpha_0) \approx \frac{WN_y}{qS}$$

Dynamic pressure, $q$, is related to differential pressure, $\Delta P$, and Mach number M.

$$q = \frac{\Delta P}{F_4(M)}$$

wherein $F_4(M)$ is a function of Mach number.

By substitution, $$C_{L\alpha}(\alpha - \alpha_0) = \frac{WN_y}{S\Delta P}F_4(M)$$

The $C_{L\alpha}$ is for trimmed conditions of the aircraft. To make the mechanization of $\alpha$ more accurate in the transient state, the effects of untrimmed flight conditions are compensated by locating the accelerometer off of the center of gravity of the aircraft.

The moments produced by the lift of the wing and the fuselage are equal and opposite to the moments produced by the tail surfaces when the aircraft is in its trimmed condition. Any additional positive or negative lift force, F, of the tail surface produces an angular acceleration, $\ddot{\theta}$ about the pitch axis of the aircraft $$\ddot{\theta} = \frac{Fr}{I}$$

wherein $r$ is the distance between the center of gravity of the aircraft and the center of pressure of the tail surfaces, and I is the moment of inertia of the aircraft about its pitch axis through its center of gravity.

Substituting $WN'_y$ in place of $WN_y$ in the above equations they become accurate for both trimmed and untrimmed flight conditions, wherein $$WN'_y = WN_y - \frac{I\ddot{\theta}}{r}$$

Then transposing, $$S\frac{\Delta P}{F_4(M)}C_{L\alpha}(\alpha - \alpha_0) = WN'_y$$

Solving for $\alpha$ $$\alpha = \frac{WN'_y}{S\Delta P} \cdot \frac{F_4(M)}{C_{L\alpha}} + \alpha_0$$

wherein $\alpha_0 = \alpha_0(M)$, a function of M.

The quantity $N'_y$ is the acceleration, in units of $g$ measured by an accelerometer located a distance $$\frac{I}{mr}$$

forward of the center of gravity of the aircraft, wherein $m$ is the mass of the aircraft and $g$ is the acceleration of gravity. The acceleration, $a'$, measured by an accelerometer so situated forward of the center of gravity, $$a' = a - \frac{I\ddot{\theta}}{mr}$$

and $$ma' = WN'_y = W\left[N_y - \frac{I\ddot{\theta}}{Wr}\right]$$

$$C_{L\alpha} = F_5(M)[1 - F_6(M)q]$$

wherein $F_5(M)$ is a predetermined function of Mach number and $F_6(M)$ is a predetermined function of Mach number corresponding to the correction due to elasticity of the airframe of the aircraft.

By substitution $$\alpha = \frac{WN'_y}{S\Delta P} \frac{F_4(M)}{F_5(M)[1-qF_6(M)]} + \alpha_0(M)$$

$qF_6(M)$ is small compared with unity and, hence, $$\alpha = \frac{WN'_y}{S\Delta P} \frac{F_4(M)}{F_5(M)} + \frac{WN'_y F_6(M)}{SF_5(M)} + \alpha_0(M)$$

Let $$\frac{F_4(M)}{F_5(M)}$$

equal a new function, $F_1(M)$ and $$\frac{F_6(M)}{SF_5(M)}$$

equal another new function, $F_3(M)$. Then $$\alpha = \frac{WN'_y}{S\Delta P} F_1(M) + WN'_y F_3(M) + \alpha_0(M)$$

In the event that it is impossible to place the accelerometer a distance $$\frac{I}{mr}$$

forward of the center of gravity two accelerometers may be used positioned distances $$\frac{I}{mr} + b \text{ and } \frac{I}{mr} - b$$

respectively forward of the center of gravity. The sum of the outputs of the two accelerometers divided by two is then equal to the output of a single accelerometer positioned at $$\frac{I}{mr}$$

An additional correction must be introduced because of the effect of the flaps of the airplane. This correction is designated $K_T$. Therefore $$\alpha = \frac{WN'_y}{S\Delta P} F_1(M) + WN'_y F_3(M) + \alpha_0(M) + K_T$$

Figure 8:
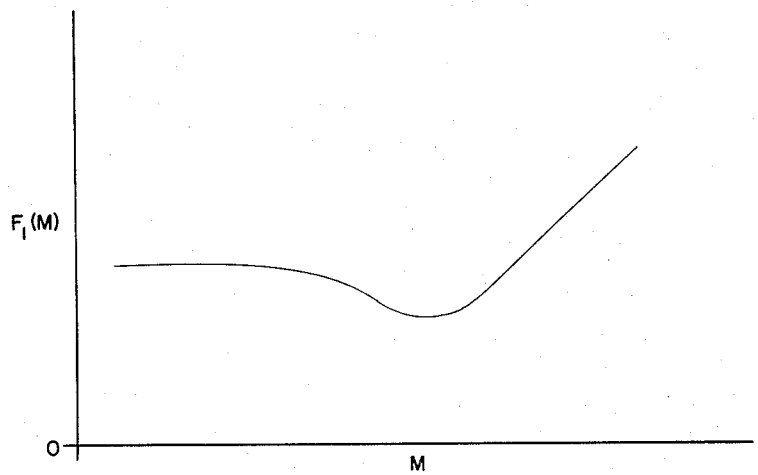
Fig. 8 is a graph of $F_1(M)$ plotted as a function of Mach number.
Figure 9:
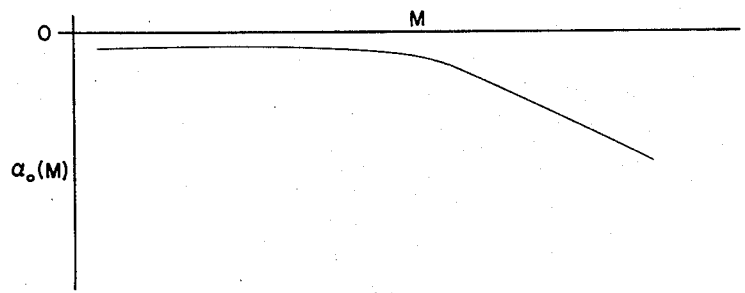
Fig. 9 is a graph of a typical $\alpha_0(M)$ plotted as a function of Mach number.

A graph of $F_1(M)$ plotted against Mach number M for a typical aircraft is shown in Fig. 8. A graph of $\alpha_0(M)$ plotted against Mach number M, for a typical aircraft is shown in Fig. 9. Figs. 8 and 9 are not necessarily plotted to the same scale.

In Fig. 2 a voltage proportional to $WN'_y$ is applied to potentiometer 7 and resistor 8 while the movable arm of potentiometer 7 is driven in accordance with the Mach number. A resultant voltage proportional to $WN'_y F_1(M)$ is generated upon the movable arm of potentiometer 7. $F_3(M)$, for most aircraft, is substantially constant in value compared to the magnitude of $$\frac{F_1(M)}{S\Delta P}$$

Hence, in Fig. 2 a voltage proportional to $WN'_y F_3(M)$ is generated at the terminal between resistors 11 and 12. Potentiometer 16 has a distributed resistance so that the voltage upon the movable arm thereof is proportional to $\alpha_0(M)$. A voltage proportional to $K_T$ is generated upon the movable contact arm of switch 19. The voltages at the junction between resistors 11 and 12, upon the movable arm of switch 19, and upon the movable arm of potentiometer 16 are added through summing resistors 14, 18 and 17, respectively, at junction 13. This voltage is then applied to potentiometer 20 where it is multiplied by $\Delta P$. The voltage upon the movable arm of potentiometer 20 is added to the voltage of the movable arm of potentiometer 7 through summing resistors 21 and 10, respectively. This voltage is amplified and divided by $\Delta P$ by means of amplifier 9, potentiometer 22, and feedback resistor 23, so that the voltage at the output of amplifier 9 is proportional to $\alpha$. The voltage at the output of amplifier 9 is connected through resistor 25 to the input of servo amplifier 24 which is, in turn, electrically connected to drive motor 26. Motor 26 moves the movable arms of potentiometers 27 and 34. The voltage upon the movable arm of potentiometer 27 is fed back through resistor 28 to the input of amplifier 24 to cause the shaft rotation of motor 26 to be just proportional to $\alpha$.

The equation mechanized up to this point assumes a linear characteristic of $C_L$ plotted against $\alpha$. However, the actual curves, as shown by curves 32 and 33 in Fig. 7, are not linear when the Mach number is increased and approaches 1. A correction is made by adding a voltage, which is proportional to $\alpha^2$, multiplied by a function $F_2(M)$ which is empirically determined to compensate for the nonlinear characteristics of $C_L$ plotted against $\alpha$. The voltage at the output of amplifier 9 which is proportional to $\alpha$ is applied to a squaring circuit such as, for example, potentiometer 34 driven by the output shaft of motor 26 so that the voltage upon the movable arm of potentiometer 34 is proportional to $\alpha^2$. The voltage upon the movable arm of potentiometer 34 is applied across potentiometer 35 which has a distributed resistance so that when the movable arm thereof is driven in accordance with Mach number, the voltage thereon is proportional to $F_2(M)$. Hence, the voltage upon the movable arm of potentiometer 35 is proportional to $\alpha^2 F_2(M)$. The voltage upon the movable arm of potentiometer 35 is connected through resistor 36 to potentiometer 20 where it is added to the voltage at junction 13 to thereby cause the voltage at the output of amplifier 9 to be proportional to $\alpha$ even at high angles of attack at all Mach numbers.

Thus, applicants have provided a useful angle of attack computer which is adapted to properly orient the aircraft so that when its rockets are fired they intercept a target. The accurate angle of attack signal generated by the device of this invention can be utilized to control the aircraft and to compute the jump of rockets launched from the aircraft to predict their alignment with the free surrounding air.

Although the invention has been described and illustrated in detail, it is to be clearly understood that the same is by way of illustration and example only and is not to be taken by way of limitation, the spirit and scope of this invention being limited only by the terms of the appended claims.

We claim:

1. Means for generating an electrical signal proportional to the angle of attack of an aircraft relative to its surrounding free air comprising electrical means for generating an electrical signal proportional to the weight of said craft multiplied by the acceleration of said craft in a direction parallel to its yaw axis; differential pressure measuring means, including a shaft, for generating a shaft rotation proportional to the difference between ram and static pressure measured upon said craft; Mach number computing means, including a shaft, for generating a shaft rotation proportional to Mach number of said craft; means having distributed resistance including a first potentiometer connected to said electrical means and connected to be mechanically driven by said Mach number computing means to generate a voltage, upon the arm of said first potentiometer, which is proportional to the weight of said aircraft multiplied by said acceleration multiplied by a first function of Mach number; means for generating an electrical signal proportional to the weight of said craft multiplied by said acceleration multiplied by a second function of Mach number; computing means connected to said Mach number means to generate a voltage proportional to a third function of Mach number; flap voltage means, including a switch, for generating a voltage in response to the position of the flaps of said aircraft; summing means for adding said flap voltage, said voltage proportional to said second function, and said voltage proportional to said third function; a second potentiometer; means for applying the voltage of said summing means across said second potentiometer, the arm of said second potentiometer being connected to be driven by said differential pressure measuring means, an amplifier, the arm of said second potentiometer being electrically connected to the input of said amplifier, the arm of said first potentiometer being electrically connected to the input of said amplifier; third potentiometer means connected across the output of said amplifier mechanically connected to said differential pressure measuring means, and electrically connected to the input of said amplifier whereby the output of said amplifier is a voltage proportional to the angle of said aircraft.

2. Means for computing the angle of attack of an aircraft comprising pressure transducer means, including a shaft, for generating a shaft rotation proportional to the difference between ram and static air pressure measured upon said aircraft; Mach number computer means, including a shaft, for generating a shaft rotation proportional to the Mach number of said aircraft; electrical means for generating an electrical voltage proportional to the weight of said aircraft multiplied by the acceleration of said aircraft in the direction of its yaw axis; a first potentiometer means electrically connected to the output of said electrical means and mechanically connected to the output of said Mach number computer means to generate a signal proportional to said weight, said acceleration, and a first predetermined function of Mach number; second potentiometer means electrically connected to said electrical means to generate an electrical signal proportional to said weight, said acceleration, and a constant function of Mach number; third potentiometer means, including a voltage source, mechanically connected to said Mach number computer means to generate a voltage proportional to the no-lift angle of attack function of Mach number; fourth potentiometer means, including a voltage source, for generating a voltage proportional to the position of the flaps of said aircraft; summing means for adding the voltage outputs of said second, third, and fourth potentiometer means; a fifth potentiometer means electrically connected to the output of said summing means and mechanically connected to be driven by said differential pressure means to multiply the output of said summing means by the differential pressure measured upon said aircraft; summing means for adding the output of said first and said fifth potentiometer means; amplifying means connected by its input to the output of said second-named summing means; variable feedback means connected across said amplifying means and mechanically connected to said differential pressure means to divide the sum of the output of said second-named summing means by the differential pressure measured upon said aircraft whereby the electrical output of said amplifier is proportional to the angle of attack of said aircraft.

3. A device as recited in claim 2 and further comprising voltage squaring means attached to the output of said amplifier to generate a voltage proportional to the square of said angle of attack; and a sixth potentiometer means electrically connected between said squaring means and the input of said fifth potentiometer means and mechanically connected to said Mach number means to generate a fourth function of Mach number and multiply said function by the square of said angle of attack to thereby achieve a high accuracy in angle of attack and to compensate for nonlinear characteristics in the lift characteristics of said aircraft at high angles of attack at all Mach numbers.

4. Computing means comprising weight measuring means for producing a signal proportional to the weight of an aircraft accelerometer means for producing a signal proportional to the acceleration of an aircraft in the direction of its yaw axis; multiplying means connected to multiply the output of said weight measuring means by the output of said accelerometer means; computer means for generating a signal proportional to the Mach number of said aircraft; pressure means for generating a signal proportional to the difference between ram and static pressure measured upon said aircraft; second multiplying and dividing means connected to the output of said first multiplying means, said computer means, and said pressure means to generate a signal proportional to said weight times said acceleration times a first predetermined function of Mach number divided by said difference in pressure; third multiplying means connected to the output of said first multiplying means and said computer means to generate a signal proportional to said weight times said acceleration times a second predetermined function of Mach number; second computer means connected to said first computer means to generate a signal proportional to the zero-lift angle of attack of said aircraft; signal means responsive to the position of the flaps of said aircraft; and summing means connected to said second and third multiplying means, said second computer means, and said signal means to generate a signal proportional to the angle of attack of said aircraft.

5. A device as recited in claim 4 and further comprising squaring means and fourth multiplying means connected to the output of said summing means to generate a signal proportional to the square of the angle of attack multiplied by a third function of Mach number, the output signal of said fourth multiplying means being connected to the input of said summing means to compensate for nonlinear characteristics of the lift coefficient of said aircraft.

References Cited in the file of this patent
UNITED STATES PATENTS

| | | |
|---|---|---|
| 2,432,939 | Sanders | Dec. 16, 1947 |
| 2,538,303 | Findley | Jan. 16, 1951 |
| 2,579,902 | Carbonara et al. | Dec. 25, 1951 |
| 2,600,159 | Ergen | June 10, 1952 |
| 2,714,309 | Redemske | Aug. 2, 1955 |